United States Patent Office 3,702,804
Patented Nov. 14, 1972

3,702,804
HYDROLYTIC ENZYMES CHEMICALLY COUPLED TO CELLULOSE ETHERS
Sidney Alan Barker, Peter John Somers, and Roger Epton, Birmingham, England, assignors to Ranks Hovis McDougall Limited, London, England
No Drawing. Filed Mar. 17, 1970, Ser. No. 20,390
Claims priority, application Great Britain, Mar. 18, 1969, 14,074/69
Int. Cl. C07g 7/02
U.S. Cl. 195—63
8 Claims

ABSTRACT OF THE DISCLOSURE

A process for the preparation of a water insoluble pullulanase, carboxypeptidase or dextranase which process comprises reacting at 0–5° C. the pullulanase, carboxypeptidase or dextranase dissolved in a buffer within a pH range of 6.5–8.6 with the p-diazophenoxy-hydroxypropyl ether of cellulose.

---

This invention is for improvements in or relating to enzymes and has particular reference to the modification of enzymes by attachment to solid matrices.

More particularly this invention relates to the water insolubilisation of enzymes by chemically attaching them to cellulose derivatives and has as an object the provision of enzyme preparations in a form where they can be re-used repeatedly and be more stable to heat than the corresponding soluble enzyme.

It is well known that when an enzyme is attached to an insoluble support the novel micro-environment of the enzyme markedly affects its stability. Hydrophilic features of the carrier tend to enhance the stability of the attached enzyme whereas hydrophobic features have the opposite effect. Polysaccharide carriers such as fibrous cellulose (M. A. Mitz and L. J. Summaria, Nature, London, 189 (1961), 576 & W. E. Hornby, M. D., Lilly and E. M. Crook, Biochem, J., 98, (1966), 420) and cross-linked dextran (R. Axen and J. Porath, Nature, London, 210 (1966), 367) have been shown to be particularly effective in conferring stability to the attached enzyme.

Commercial samples of water insoluble forms of trypsin, chymotrypsin, ribonuclease, glucose oxidase and ficin became available in February 1968. These were obtained by reaction of the appropriate enzyme with carboxymethyl cellulose hydrazide and are marketed by Seravac Laboratories, Ltd., Maidenhead, Berks.

Almost simultaneously (January 1968) Miles Laboratories, Inc., Elkhart, U.S.A., marketed water insoluble forms of trypsin, chymotrypsin and papain in which the enzymes were bound to ethylene-maleic anhydride copolymer carrier.

R. Axen and J. Porath, Nature 210 (1966), 367, succeeded in preparing active water insoluble chymotrypsin and trypsin by reaction of the enzymes with p-isothiocyanato phenoxy hydroxypropyl—"Sephadex" (cross-linked dextran).

It is an object of the present invention to provide active water insoluble preparations of other enzymes wherein the enzyme is chemically coupled with the p-diazophenoxyhydroxypropyl ether derived from micro-crystalline cellulose.

The present invention provides a water insoluble pullulanase, carboxypeptidase or dextranase chemically coupled to a solid matrix.

More specifically, the present invention provides a water insoluble pullulanase, carboxypeptidase or dextranase chemically coupled to p-diazophenoxyhydroxypropyl cellulose.

According to the present invention there is also provided a process for the preparation of a water insoluble pullulanase, carboxypeptidase or dextranase which process comprises reacting at 0.5° C. the pullulanase, carboxypeptidase or dextranase dissolved in a buffer within a pH range of 6.5–8.6, and preferably 6.6–7.7 with the p-diazophenoxyhydroxypropyl ether of cellulose.

The most preferred pH is between 7.6 and 7.7. Unreacted diazo groups in the cellulose derivative are annealed by reaction with either β-naphthol or phenol. Preferably microcrystalline cellulose is used for the preparation of this ether and the degree of substitution of ether groups in the cellulose can be 13–56.2 microequivalents (preferably 13 microequivalents) of p-diazophenoxyhydroxypropyl ether groups per gram of cellulose. Active water insoluble preparations of pullulanase, carxoxypeptidase and dextranase were obtained by this process which where more heat stable when suspended in an aqueous buffer than the corresponding soluble enzyme.

The fungus *Pullularia pullulans* synthesises a glucan designated pullulan containing al→4 and al→6 linkages in the proportions 2.2:1 (H. O. Bouveng, H. Kiessling, B. Lindberg and J. McKay, Acta Chem. Scand., 17 (1963) 1351) and in the regular sequence $$[\rightarrow 6)-\alpha-G-(1\rightarrow 4)-\alpha-G-(1\rightarrow 4)-\alpha-G-(1\rightarrow ]n$$

where $n$ is ca. 90. [H. O. Bouveng, H. Kiessling, B. Lindberg and J. McaKy, Acta Chem. Scand., 17 (1963) 797]. A similar polysaccharide designated "restpullulan" which differs only from pullulan in certain fine details of structure has been shown to be completely degraded to maltotriose, a compound of much potential industrial importance, by the enzyme pullulanase obtained from *Aerobacter aerogenes* [H. Bender, J. Lehmann and K. Wallenfels, Biochim. Biophys. Acta 36 (1959) 309]. Since pullulanase is specific for the cleavage of α—1→6 glucosidic linkages it is useful for the debranching of the amylopectin component of starches to produce dextrins of industrial importance [M. Abdullah, B. J. Catley, E. Y. C. Lee, J. Robyt, K. Wallenfels and W. J. Whelan, Cereal Chemistry, 43 (1966) 111].

The role of sucrose in cariogenesis has been recently reviewed, (Winter, G. B. British Dental Journal, 1968, 124, 407) and implicates those oral bacteria such as streptococci which produce extracellular polysaccharides of the dextran type. These polysaccharides of high viscosity and high molecular weight have been found (Critchley, P., Wood, J. M., Saxton, C. A. and Leach, S. A., Caries Research, 1967, 1, 112) to form a major component of the extracellular matrix of dental plaque.

Early biosynthetic work (Hehre, E. J., Adv. Enzymology, 1951, 11, 297, and Hehre, E. J. Science, 1941, 93, 237) in vitro established that sucrose is the specific substrate utilised by the enzyme dextransucrase for dextran synthesis whether the enzyme was derived from Leuconostoc or streptococci. However considerable variation in the type of dextran synthesised was encountered among the various strains of these organisms. Whereas they all had in common short on long chains of α-1:6 D-glucopyranose units most of the dextrans were branched either by α-1:4-linkages or α-1:3-linkages (Stacey, M. and Barker, S. A., Polysaccharides of Micro-Organisms Oxford University press, 1960, p. 138, and Barker, S. A., Bourne, E. J., Bruce, G. T., Neeley, W. B. and Stacey, M. J. Chem. Soc., 1954, 2395). A much less common biosynthetic route involves as a substrate α-1:4 linked D-glucopyranose chains of the amylodextrin type and the synthesis of α-1:6 linked D-glucopyranose units therefrom by enzymes present in *Acetobacter viscosum* or *capsulatum*.

Claims have been made that dental plaque which has already formed is apparently dissipated by addition of dextranase to the diet of experimental animals. The use of dextranase attached to a water insoluble matrix should be even more effective. The solid enzyme would not be so quickly dissipated from the mouth as in the liquid form. It would have the further advantage that the enzyme would have an enhanced stability if it was required to be incorporated into foods or sweets.

Example 5 hereafter describes the attachment of the enzyme *Penicillium funiculosum* dextranase to the cellulose ether described above.

The proteolytic enzyme carboxypeptidase A is an α-carboxypeptide amino acid hydrolase derived from pancreas. It hydrolyses peptides from the carboxylic acid end, splitting off the C-terminal L-amino acid residue unless this is a basic residue or proline. The general source is from bovine pancreas. [M. L. Anson, J. Gen. Physiol., 20 (1937) 603; and F. W. Putnam and H. Neurath, J. Biol. Chem., 166 (1946) 603.] It is useful in research for determination of end groups in peptides and proteins. Such a preparation purchased from Sigma Chemical Company from bovine pancreas was bound to the cellulose ether as hereinafter described in Example III.

The particular merits of the present invention for providing water insoluble enzymes is that it can provide a product with a high retention of activity when calculated as a percentage of the activity which that amount of enzyme protein bound to the cellulose derivative would display in its original soluble form. The second advantage is that the use of microcrystalline cellulose in the preparation of the ether affords a dense hydrophilic carrier available in a fine particulate form for maximum surface exposure yet easily recoverable after use by centrifugation or filtration. The third advantage is the much greater heat stability of the water insoluble enzymes which may be obtained by the process of the present invention compared with the corresponding soluble enzyme giving a greater shelf life, a greater retention of activity at operating temperatures and enabling maximum repetitive use to be made of the enzyme.

Following is a description by way of example of methods of carrying the invention into effect.

EXAMPLE 1

A sample of microcrystalline cellulose (10 g., Sigmacel type 38 purchased from the Sigma Chemical Company, England) was placed in a 50 ml. stoppered round-bottomed flask which was subsequently evacuated, left for one hour and filled with nitrogen. The flask was warmed to 50° C. and aliquot (20 ml.) of a 10% solution of p-nitrophenylglycidyl ether (2 g. of the ether in 20 ml. toluene) added followed by an aliquot (10 ml.) of 10% aqueous sodium hydroxide. The solutions of p-nitrophenylglycidyl ether and the aqueous sodium hydroxide were deoxygenated before being added. The contents of the flask were then well mixed and stoppered. All separations were performed under nitrogen. The flask was then maintained at 50° C. for 24 hours. The reaction mixture was transferred to a mortar and ground lightly with 2 N acetic acid before being suspended and stirred for 0.5 hour with the same solvent (0.5 l.). The p-nitrophenoxyhydroxypropyl cellulose ether was then collected, washed, and ground lightly with acetone (0.5 l.) for 0.5 hour.

After five washings with distilled water (1 l.) and one further washing with acetone (0.5 l.) the pale yellow ether was collected on a filter and dried.

Reduction of the p-nitro-phenoxyhydroxypropyl cellulose was effected by suspending the sample (8.5344 g.) in a 5% solution of titanous chloride in 6 N hydrochloric acid (200 ml.) for 5 minutes at 100° C. The p-aminophenoxyhydroxypropyl cellulose hydrochloride was collected on a filter and washed with 2 N hydrochloric acid until free of excess titanous chloride.

After grinding lightly in a mortar with distilled water the sample was washed three times with distilled water (1 l.) and finally with acetone (500 ml.) before being collected on a filter and dried. The yield of p-aminophenoxyhydroxypropyl cellulose ether hydrochloride was 8.3108 g.

A sample (100 mg.) of the p-aminophenoxyhydroxypropyl cellulose ether hydrochloride was placed in a stoppered test tube together with an aliquot (5 ml.) of hydrochloric acid (1 N). The tube was placed in an ice bath and magnetically stirred for 15 minutes when 4 ml. of 2% ice-cold sodium nitrite was added. After a further 15 minutes the tube was centrifuged the supernatant discarded, 15 ml. aliquots of ice-cold phosphate buffer (0.075 M, pH 7.6–7.7) added and the contents stirred magnetically for 15 minutes. The washing cycle was repeated three times at 0° C. The centrifuged cellulose derivative was taken, pullulanase (20 mg.) in 0.04 M acetate buffer pH 5 (1 ml.) was added, and the tube stirred magnetically at 0–5° C. for 18 hours. Ice-cold β-naphthol (0.1%; 5 ml.) in saturated sodium acetate was added.

After stirring a further 15 minutes at 0° C. the water insoluble pullulanase derivative was subjected to five cycles of washing with 15 ml. acetate buffer (0.05 M, pH 5) and sodium chloride (0.5 M, 15 ml.) in the same buffer. The pullulanase derivative was finally washed three times with acetate buffer (0.04 M, pH 5). The insoluble pullulanase was finally suspended in 10 ml. 0.04 M acetate buffer pH 5.

Pullulanase activity was assayed by stirirng the enzyme suspension (1 ml.) with pullulan solution (0.5%; 10 ml.; 0.04 M acetate buffer pH 5) at 30° C. Samples (1 ml.) were removed at times zero, 15 minutes, 30 minutes and 60 minutes and pipetted directly into assay tubes containing 3,5-dinitrosalicylate reagent (1 ml., made from the acid dissolved in 2 N NaOH [50 ml.], 125 ml. water containing 75 g., Rochelle salt added and the whole diluted to 250 ml.). Assay tubes were then heated at 100° C. for 5 minutes, cooled rapidly on a water bath, centrifuged and the optical density read at 520 mμ against a blank prepared containing acetate buffer instead of enzyme.

RESULTS

Functional group active in protein binding: p-Diazophenoxyhydroxypropyl

Mg. bound protein/100 mg. derivative _____ 4.04
Enzyme units [1]/mg. bound protein _____ 0.306
Percent activity retained by enzyme after coupling _____ 14.1

[1] One pullulanase unit is that which liberates 1μmole of maltotriose per mg. protein in 1 minute at 30° C. and pH 5.

EXAMPLE II

A sample of water-insoluble pullulanase (25 mg.) was suspended in acetate buffer (0.04 M, pH 5, 2.5 ml.) and incubated at 30° C. Aliquots (0.25 ml.) were withdrawn at times 0, 3 hours, 1 day, 3 days, 5 days, 7 days and pipetted directly into a magnetically stirred pullulan solution (2.5 ml., 0.5%) in acetate buffer 0.04 M, pH 5 at 30° C. The activity of the water insoluble pullulanase sample was then determined by periodic sampling and assay of the digests with dinitrosalicylate reagent as described previously. Hence the percentage of the original activity remaining in the water-insoluble pullulanase preparation was determined.

A control incubation was performed in which the water-insoluble pullulanase was replaced by a solution of an equivalent amount of free pullulanase in acetate buffer (0.04 M, pH 5, 2.5 ml.).

RESULTS

| Enzyme | Mode of coupling | Temp., °C. | Percent retention of activity after— | | | | |
|---|---|---|---|---|---|---|---|
| | | | 3 hrs. | 1 day | 3 days | 5 days | 7 days |
| Pullulanase | Diazo | 30 | 83.7 | 47.5 | 26.0 | 9.6 | 0.0 |
| | None | 30 | 83.0 | 39.0 | 2.0 | | |

EXAMPLE III

A sample (100 mg.) of the p-aminophenoxyhydroxypropyl cellulose ether hydrochloride (prepared in Example I) was placed in a stoppered test tube together with an aliquot (5 ml.) of hydrochloric acid (1 N). The tube was placed in an ice bath and magnetically stirred for 15 minutes when 4 ml. of 2% ice-cold sodium nitrite was added. After a further 15 minutes the tube was centrifuged, the supernatant discarded, 15 ml. aliquots of ice-cold phosphate buffer (0.075 M, pH 7.6–7.7) added and the contents stirred magnetically for 15 minutes. The washing cycle was repeated three times at 0° C. The centrifuged cellulose derivative was taken, carboxypeptidase (8.2 mg.) in phosphate buffer 0.075 M, pH 7.6–7.7 (1 ml.) was added, and the tube stirred magnetically at 0–5° C. for 24 hours when ice-cold β-naphthol (5 ml.; 0.1%) in saturated sodium acetate was added.

After stirring a further 15 minutes at 0° C. the water-insoluble carboxypeptidase derivative was subjected to five cycles of washing with 15 ml. phosphate buffer (0.02 M, pH 6.9) and sodium chloride (0.5 M) 15 ml. in the same buffer.

The carboxypeptidase derivative was finally washed three times with phosphate buffer (0.02 M, pH 6.9), and the stirrer bars removed and phosphate buffer (0.075 M, pH 7.6–7.7) 10 ml. added.

Carboxy peptidase activity was assayed by stirring the enzyme suspension (1 ml.) with N-carbobenzoxy glycyl L. phenyl alanine solution (0.1%) 10 ml., in phosphate buffer (0.075 M, pH 7.6–7.7) at 30° C. Samples (1 ml.) were removed at times zero, 5, 10, 15 minutes and pipetted directly into assay tubes containing ninhydrin reagent (1 ml.). The Moore and Stein ninhydrin reagent was always prepared immediately before use: $SnCl_2 \cdot 2H_2O$ (0.040 g.) was dissolved in citrate buffer (25 ml.), 0.2 M, pH 5.0, ninhydrin stock solution (25 ml.) was added and white spot nitrogen passed through the solution for 15 minutes. Assay tubes were then heated at 100° C. for 5 minutes, cooled rapidly on a water bath, centrifuged and the optical density read at 570 mμ against a blank prepared containing phosphate buffer instead of enzyme.

RESULTS

Functional group active in protein binding: p-Diazo phenoxyhydroxypropyl

Mg. bound proteoin/100 mg. derivative _____ 1.68
Enzyme units [1]/mg. bound protein _____ 6.88
Percent activity retained by enzyme after coupling _____ 15.6

[1] One carboxypeptidase unit is that which liberates 1 μmole of L-phenylalanine per mg. protein in 1 minute at 30° C. and pH 7.6–7.7.

EXAMPLE IV

A sample of water-insoluble carboxypeptidase (20 mg.) (prepared in Example III) was suspended in phosphate buffer (0.075 M, pH 7.6, 2 ml.) and incubated at 30° C. Aliquots (0.25 ml.) were withdrawn at times 0, 3 hours, one-day, 3 days, 6 days, 7 days and pipetted directly into a magnetically stirred N - carbobenzoxy - glycyl L-phenylalanine solution (2.5 ml., 0.1%) in phosphate buffer 0.075 M, pH 7.6 at 30° C. The activity of the water insoluble carboxypeptidase sample was then determined by periodic sampling and assay of the digests with ninhydrin reagent as described previously. Hence the percentage of the original activity remaining in the water-insoluble carboxypeptidase preparation was determined. A control incubation was performed in which the water-insoluble carboxypeptidase was replaced by a solution of an equivalent amount of free carboxypeptidase in phosphate buffer 0.075 M, pH 7.6, 2 ml.

RESULTS

| Enzyme | Mode of coupling | Temp., °C. | Percent retention of activity after— | | | | |
|---|---|---|---|---|---|---|---|
| | | | 3 hrs. | 1 day | 3 days | 5 days | 7 days |
| Carboxypeptidase | Diazo | 30 | 79 | 54 | 26 | 15 | 3 |
| | None | 30 | 38.4 | 4.1 | 0.0 | | |

EXAMPLE V

A sample (100 mg.) of the p-aminophenoxyhydroxypropyl cellulose ether hydrochloride (prepared in Example 1) was placed in a stoppered test tube together with an aliquot (5 ml.) of hydrochloric acid (1 N). The tube was placed in an ice bath and magnetically stirred for 15 minutes when 4 ml. of 2% ice-cold sodium nitrite was added. After a further 15 minutes the tube was centrifuged, the supernatant discarded, 1.5 ml. of ice-cold phosphate buffer (0.075 M; pH 7.6) added and the contents stirred magnetically for 15 minutes. The washing cycle was repeated three times at 0° C. The centrifuged cellulose derivative was taken, dextranase (1 ml.) in 0.075 M phosphate buffer pH 7.6 was added and the tube stirred magnetically at 0–5° C. for 24 hours when ice-cold β-naphthol (5 ml.; 0.1%) in saturated sodium acetate was added.

After stirring a further 15 minutes at 0° C. the water insoluble dextranase derivative was subjected to five cycles of washing with 15 ml. phosphate buffer (0.2 M, pH 6.9) and sodium chloride (0.5 M) 15 ml. in the same buffer. The insoluble dextranase derivative was finally washed three times with citrate buffer (0.2 M; pH 5), the stirrer bars removed and 10 ml. 0.2 M citrate buffer pH 5 was added.

EXAMPLE VI

A sample of the water insoluble dextranase suspension (2 ml.) (prepared in Example V) in 0.2 M citrate buffer pH 5 was incubated at 37° C. Aliquots of 0.25 ml. were removed after times 0, 1, 2 and 3 days and pipetted directly in a magnetically stirred dextran solution (0.5%; 2.5 ml.). The activity of the water insoluble dextranase was then determined by 0.5 ml. periodic sampling (0, 15, 30 and 60 minutes) and assay of the digests with the 3,5-dinitrosalicylate reagent (0.5 ml.) as described in Example I. Hence the percentage of the original activity remaining in the water-insoluble dextranase was determined. A control incubation was performed to determine the loss of inactivity of an equivalent amount of free soluble dextranase in 0.2 M citrate buffer pH 5 at 37° C.

RESULTS

| Enzyme | Mode of coupling | Temp., °C. | Percent retention of activity after— | | | |
|---|---|---|---|---|---|---|
| | | | 3 hrs. | 1 day | 2 days | 3 days |
| Dextranase | Diazo | 37 | | 53 | 32.3 | 25.8 |
| | None | 37 | 70.3 | 0.0 | | |

We claim:

1. A process for the preparation of a water insoluble enzymatically-active pullulanase, carboxypeptidase or dextranase which process comprises reacting at 0–5° C. the pullulanase, carboxypeptidase or dextranase dissolved in a buffer within a pH range of 6.5–8.6 with the p-diazophenoxy-hydroxypropyl ether of cellulose.

2. A process as claimed in claim 1 wherein the pH is between 7.6 and 7.7.

3. A process as claimed in claim 1 wherein unreacted diazo groups in the cellulose derivative are annealed by reaction with β-naphthol or phenol.

4. A process as claimed in claim 1 wherein microcrystalline cellulose is used for the preparation of the ether and the degree of substitution of ether groups in the cellulose is between 13 and 56.2 microequivalents of p-diazophenoxyhydroxypropyl ether groups per gram of cellulose.

5. Enzymatically active pullulanase chemically coupled to p-diazophenoxyhydroxypropyl cellulose.

6. Enzymatically active carboxypeptidase chemically coupled to p-diazophenoxyhydroxypropyl cellulose.

7. Enzymatically active dextranase chemically coupled to p-diazophenoxyhydroxypropyl cellulose.

8. A process as claimed in claim 1 wherein the pH is 6.6–7.7.

References Cited

Barker et al.: Preparation and Properties of α-Amylase Chemically Coupled to Microcrystalline Cellulose, Carbohydrate Research, 1968, vol. 8 (pp. 491–497).

Silman et al.: Water-Insoluble Derivatives of Enzymes, Antigens, and Antibodies, Annual Review of Biochemistry, 1966, vol. 35, Part II (pp. 881–886).

A. LOUIS MONACELL, Primary Examiner

D. M. NAFF, Assistant Examiner

U.S. Cl. X.R.

195—68, DIG 11